US011728997B2

(12) United States Patent
Dover

(10) Patent No.: US 11,728,997 B2
(45) Date of Patent: Aug. 15, 2023

(54) CLOUD-BASED CREATION OF A CUSTOMER-SPECIFIC SYMMETRIC KEY ACTIVATION DATABASE

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/014,206

(22) Filed: Sep. 8, 2020

(65) Prior Publication Data

US 2022/0078022 A1 Mar. 10, 2022

(51) Int. Cl.
*H04L 9/32* (2006.01)
*H04L 9/08* (2006.01)

(52) U.S. Cl.
CPC .......... *H04L 9/3242* (2013.01); *H04L 9/0861* (2013.01); *H04L 9/3215* (2013.01)

(58) Field of Classification Search
None
See application file for complete search history.

(56) References Cited

U.S. PATENT DOCUMENTS

| | | | |
|---|---|---|---|
| 1,006,193 A | 10/1911 | Ford | |
| 10,061,932 B1* | 8/2018 | Combs | ................. G06F 3/1222 |
| 10,121,151 B2 | 11/2018 | Chanez et al. | |
| 10,615,969 B1* | 4/2020 | Griffin | ................. H04L 9/0822 |
| 11,184,157 B1* | 11/2021 | Gueron | ................. H04L 9/0825 |
| 2004/0088559 A1 | 5/2004 | Foster et al. | |
| 2008/0052698 A1 | 2/2008 | Olson et al. | |
| 2009/0260002 A1 | 10/2009 | Volovic et al. | |
| 2010/0299172 A1* | 11/2010 | Nottoli | ................. G06Q 10/06 705/7.18 |
| 2010/0306538 A1* | 12/2010 | Thomas | ................. H04L 9/0891 713/168 |
| 2011/0161658 A1* | 6/2011 | Pashalidis | ........... H04W 12/082 713/155 |
| 2011/0246773 A1* | 10/2011 | Sidle | ..................... G06F 21/305 713/168 |
| 2013/0326224 A1* | 12/2013 | Yavuz | ................. H04L 9/3247 713/176 |
| 2015/0089230 A1* | 3/2015 | Niset | ..................... H04L 9/3242 713/170 |

(Continued)

FOREIGN PATENT DOCUMENTS

CN 101179787 5/2008

OTHER PUBLICATIONS

International Search Report and Written Opinion, PCT/US2021/049319, dated Dec. 3, 2021.

*Primary Examiner* — Bassam A Noaman
(74) *Attorney, Agent, or Firm* — Greenberg Traurig

(57) ABSTRACT

The disclosed embodiments are related to securely updating a semiconductor device and in particular to a key management system. In one embodiment, a method is disclosed comprising receiving a request for an activation code database from a remote computing device, the request including at least one parameter; retrieving at least one pair based on the at least one parameter, the pair including a unique ID (UID) and secret key; generating an activation code for the UID; and returning the activation code to the remote computing device.

18 Claims, 6 Drawing Sheets

(56) References Cited

U.S. PATENT DOCUMENTS

| | | | |
|---|---|---|---|
| 2015/0312255 A1* | 10/2015 | Libonate | H04L 63/0876 |
| | | | 713/168 |
| 2016/0246585 A1 | 8/2016 | Li et al. | |
| 2016/0275491 A1 | 9/2016 | Kaladgi et al. | |
| 2019/0140896 A1* | 5/2019 | Gesch | G06Q 10/20 |
| 2019/0149527 A1* | 5/2019 | John | H04L 63/0435 |
| | | | 713/171 |
| 2020/0089488 A1 | 3/2020 | Yu et al. | |
| 2021/0218710 A1* | 7/2021 | Fallah | G06F 16/9024 |

* cited by examiner

CLOUD-BASED CREATION OF A CUSTOMER-SPECIFIC SYMMETRIC KEY ACTIVATION DATABASE

RELATED APPLICATIONS

The present application relates to commonly-owned applications bearing Ser. No. 17/014,203 and Ser. No. 17/014,215, filed simultaneously with the instant application, the disclosures of which are incorporated by reference in their entirety.

FIELD OF THE TECHNOLOGY

At least some embodiments disclosed herein relate generally to semiconductor devices and, in particular, to providing secure field upgrades to semiconductor devices.

BACKGROUND

Currently, many semiconductor devices (e.g., semiconductor memory devices) provide field-upgradable functionality that allows for post-fabrication updates to the devices. For example, a memory device may provide the ability to update the firmware of the memory device after the memory device is fabricated and installed. Securing these field upgrades is paramount to the reliable and trusted operation of such devices. Some devices utilize symmetric encryption to secure field upgrades. In these devices, a manufacturer and semiconductor device share a secret key and rely on these keys to encrypt and decrypt field upgrades. In a symmetric key system, the keys are unique between two parties (e.g., manufacturer and end-user). However, key distribution in such systems suffers from numerous deficiencies remedied by the disclosed embodiments.

First, many systems rely exclusively on cloud-based key distribution techniques. These techniques require an end-user (e.g., device owner) to be connected to a public network to download keys. However, the requirement of a public network connection introduces potential security risks. Second, most cloud-based systems rely on unique identifier (UID) values to enable an end-user to request a symmetric key from a cloud-based platform. Generally, these UID values must read from the semiconductor device individually and uploaded individually. Thus, bulk access to symmetric keys is not feasible since the electrical identification of UID values is generally only available during manufacturing when access to a public network is not possible. Moreover, retrieving symmetric keys in a high-value manufacturing (HVM) environment is often not feasible given the temporal latency involved in the operation and the costs introduced by that latency.

DETAILED DESCRIPTION

The disclosed embodiments solve the aforementioned problems and other problems in the art. The disclosed embodiments allow end-users to activate capabilities in semiconductor devices using symmetric key cryptography in a manufacturing environment without requiring a connection to a public network and, ultimately, a cloud-based KMS. Further, the disclosed embodiments support requests for multiple symmetric keys at once. Further, the disclosed embodiments preserve the ability to prevent symmetric exposure end-to-end, but do so for multiple devices at once when connecting to a KMS. These and other features are described in more detail with reference to the disclosed embodiments.

Figure 1:
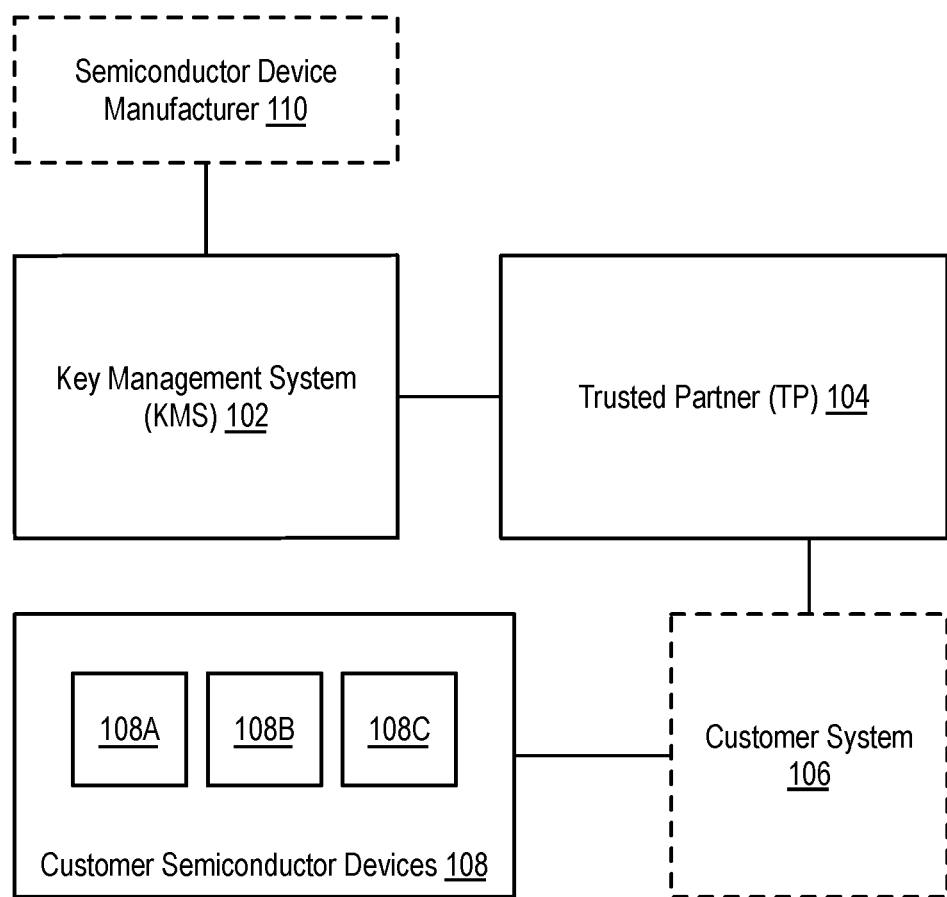
FIG. 1 is a block diagram illustrating an authentication system according to some embodiments of the disclosure.

FIG. 1 is a block diagram illustrating an authentication system according to some embodiments of the disclosure.

The illustrated system includes a semiconductor device manufacturer (110), KMS (102), trusted partner (TP) (104), customer system (106), and a plurality of semiconductor devices (108). In the illustrated embodiment, the manufacturer (110) is the manufacturer of devices (108). In the illustrated embodiment, the manufacturer (110) can communicate with the KMS (102) via a secure channel. In some embodiments, the manufacturer (110) uploads, for each device (108), a corresponding unique identifier (UID) and a device secret key, also referred to as a manufacturer's storage root key (MFGSRK) to the KMS (102). In the illustrated embodiment, the MFGSRK is generated in a secure manufacturing environment of the manufacturer (110). In some embodiments, the manufacturer (110) also uploads a customer identifier (CID) for each customer that purchases or otherwise is associated with a device (108). In some embodiments, the manufacturer also uploads a customer authentication key (CAK) associated with a CID. In one embodiment, the CAK is limited to a specified date range, thus becoming invalid after the last day of the range passes. The UID, MFGSRK, CID, and CAK values are collectively referred to as "manufacturing data."

In the illustrated embodiment, the KMS (102) stores the aforementioned data received from the manufacturer (110). In one embodiment, the KMS (102) comprises a server, or multiple servers, for storing the manufacturing data. In some embodiments, the KMS (102) utilizes a hardware security module (HSM) to secure the manufacturing data. In the illustrated embodiment, the KMS (102) is capable of generating activation codes for each of the received UIDs. In some embodiments, an activation code comprises an integer or similar processible value. In some embodiments, the KMS (102) generates an activation code in response to a request from TP (104).

In the illustrated embodiment, the TP (104) comprises a computing system that is securely and communicatively coupled to KMS (102). In the illustrated embodiment, the TP (104) issues network requests to the KMS (102) for batches of activation codes (also referred to as an activation database). In one embodiment, the request for an activation database includes the CID, a date range, a device type, and a nonce unique to a customer and known by the KMS (102) (referred to as "KMS nonce"). In some embodiments, a customer negotiates the KMS nonce with the KMS (102) via a network communication session, thus establishing a commonly known value for the KMS nonce. In the illustrated embodiment, the TP (104) receives and stores the contents of the activation database. In some embodiments, the TP (104) also includes an HSM for securing the activation database. In the illustrated embodiment, the TP (104) also includes processing capabilities for generating a message authentication code (MAC) for a given customer. Further, in the illustrated embodiment, the TP (104) includes processing capabilities for generating a secure database of shared device secrets based on the activation codes in the activation database and response codes received from semiconductor devices (108).

In the illustrated embodiment, the customer system (106) communicates with the TP (104). The customer system (106) may comprise a customer's manufacturing line or other systems for handling semiconductor devices (108). The specific arrangement of computing devices of the customer system (106) is not limited herein. In some embodiments, TP (104) comprises one or more secure computing devices installed within a customer system (106). In other embodiments, the TP (104) is a separate computing system from the customer system (106).

In the illustrated embodiment, the customer system (106) interacts with a plurality of semiconductor devices (108a), (108b), (108c) (collectively, 108). The devices (108) comprise semiconductor devices such as, but not limited to, memory devices. For example, devices may comprise NOR or NAND Flash memory chips, system-on-a-chip (SoC) devices, or other types of discrete semiconductor packages.

The devices (108) include a plurality of non-volatile storage locations for storing various fields and parameters such as a CID and CAK. The devices (108) additionally include hardware or firmware capable of performing cryptographic operations such as operations supporting a MAC. Examples of such operations include HMAC-SHA256, AES, and CMAC operations. One example of a device (108) is provided in the description of FIG. 5, the disclosure of which is incorporated herein by reference in its entirety.

Figure 2:
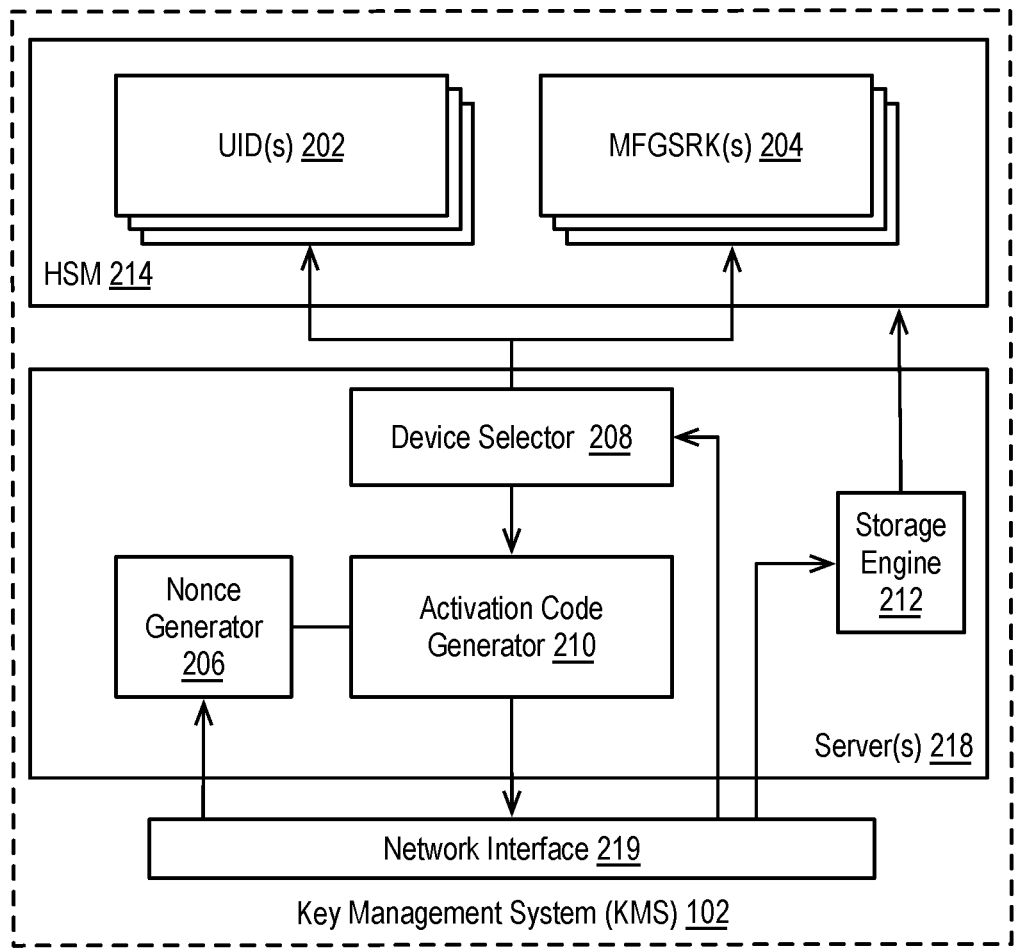
FIG. 2 is a block diagram illustrating a key management system (KMS) according to some embodiments of the disclosure.

FIG. 2 is a block diagram illustrating a KMS according to some embodiments of the disclosure. In the illustrated embodiment, the KMS (102) may be implemented via one or more computing devices such as server devices. One such computing device is described in connection with FIG. 6.

In the illustrated embodiment, the KMS (102) comprises a networked computing device capable of storing unique identifier (UID) values and corresponding manufacturer storage root key (MFGSRK) values.

In the illustrated embodiment, a UID refers to a unique identifier that uniquely identifies a semiconductor device (108). In some embodiments, the UID may comprise a serial, barcode, or other electrically readable identifiers. During manufacturing, a manufacturer (110) may generate the UID. The UID may not be known until digitally read by the customer (e.g., during the manufacturing of a larger device). In some embodiments, the UID is read during manufacturing and thus is performed "offline" (i.e., not connected to a network device). In some embodiments, the UID includes a date field describing the manufacturing date of the semiconductor device (108). If a date field is included, the UID may include additional fields as well.

In one embodiment, an MFGSRK is also written by the manufacturer (110) during manufacturing. In one embodiment, an MFGSRK is uniquely paired to the UID. No limitation is placed on the specific mechanism used by the manufacturer (110) to generate the MFGSRK; however, a fixed-width value generated via a cryptographic algorithm is generally utilized.

In the illustrated embodiment, during manufacturing, a manufacturer (110) will generate UID-MFGSRK pairs for each individual semiconductor device (108). During manufacturing, the manufacturer (110) connects to the KMS (102) via a network connection or similar connection. As illustrated, KMS (102) includes a network interface (NIC) (219) to enable the receipt of data. In some embodiments, the NIC (219) is used to create a virtual private network, while in other embodiments, the NIC (219) may be used to connect to a public network (e.g., the Internet). Hybrid networks may be also be used. In the illustrated embodiment, the NIC (219) is illustrated external to servers (219). In this embodiment, the NIC (219) may comprise one or more NICs operating as a load balancer. In other embodiments, the NIC (219) may comprise part of a server (218).

In some embodiments, the servers (218) include one or more application layers for processing network requests from manufacturers (110). Such application layers handle the authentication of manufacturers and other administrative tasks that are not described in detail herein. The application layers also handle routing of valid network requests from manufacturers (110) to domain-specific processing logic such as the device selector (208) and nonce generator (206). The application layer also receives data generated by the activation code generator (210) and packages the data for network transmission to third-parties. Each of these components (206-212) may be implemented on separate computing devices or on a single computing device. Further, some or all of the functionality may be implemented in hardware (e.g., dedicated circuitry), software, firmware, or a combination thereof. Details of components (206-212) are described in more detail herein.

The KMS (102) additionally includes a hardware security module (HSM) (214). The HSM (214) comprises a physically separate storage layer for storing sensitive data such as UID (202) and MFGSRK (204) values. In some embodiments, the HSM (214) comprises a separate, physical computing device such as a dedicated server. In other embodiments, the HSM (214) may comprise a pluggable device that connects to one or more of the servers (218). The HSM (214) may include one or more cryptographic processors for securing data therein. The HSM (214) may have tamper detection functionality.

Figure 3:
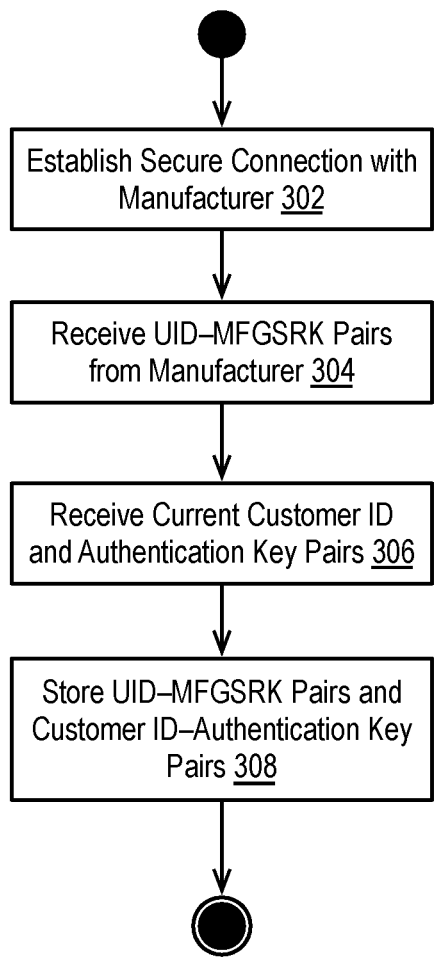
FIG. 3 is a flow diagram illustrating a method for building and managing a database of keys according to some embodiments.
Figure 4:
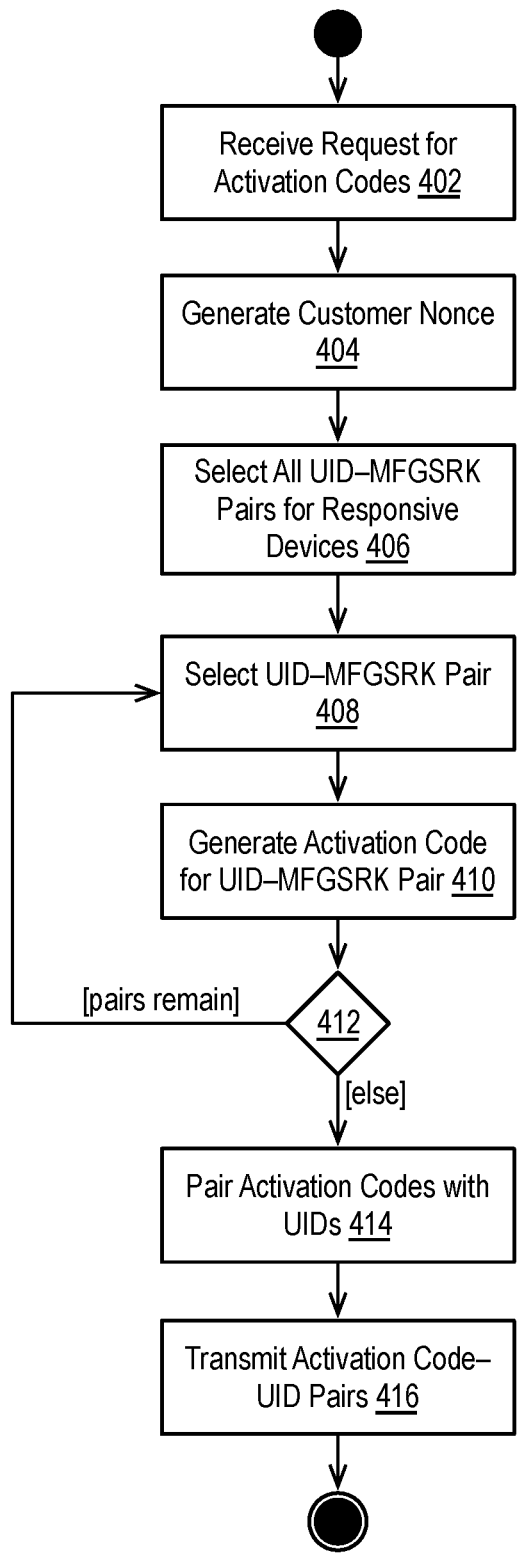
FIG. 4 is a flow diagram illustrating a method for generating a symmetric key activation database according to some embodiments.

In the illustrated embodiment, the KMS (102) performs various functions including the receipt and secure storage of UID-MFGSRK pairs from manufacturers, generation of activation codes paired with UID values, and secure nonce generation; each of these functions is described in more detail herein and in further detail in the descriptions of FIGS. 3 and 4.

As illustrated, a storage engine (212) receives data over the NIC (219). The data may comprise UID-MFGSRK received from manufacturers (110). In one embodiment, manufacturers (110) establish a secure connection with the servers (218), such as a transport layer security (TLS) connection, and upload UID-MFGSRK pairs to the servers (218). The servers (218) route the UID-MFGSRK pairs to the storage engine (212), which coordinates long-term storage in the HSM (214). In one embodiment, the storage engine (212) may confirm that no duplicates are uploaded and may perform verification that the UID and/or MFGSRK are properly formatted (e.g., correct length, character set, etc.). In embodiments where the UID includes a date field, the storage engine (212) may additionally extract the date and verify it is valid. For example, the storage engine (212) may reject dates occurring too far in the past or future. The storage engine (212) may additionally reject a UID that includes a date range exceeding a time period (e.g., one month). After validating the UID-MFGSRK pairs, the storage engine (212) writes the UID-MFGSRK pairs to the HSM (214). In some embodiments, the storage engine (212) may return an appropriate status code to the manufacturer (110) upon completing writing to the HSM (214). For example, the storage engine (212) may return a Hypertext Transport Protocol (HTTP) header value of 200, indicating that the request was successful. If an error occurred (e.g., validation), the storage engine (212) may return a corresponding error code (e.g., HTTP 500), indicating an error has occurred. In some embodiments, the storage engine (212) may include a response body summarizing the actions taken.

The servers (218) additionally include a nonce generator (206). In the illustrated embodiment, the nonce generator (206) is configured to generate a random or pseudo-random nonce value given zero or more inputs. In one embodiment, the nonce generator (206) receives an existing nonce value (referred to as a KMS nonce). In one embodiment, the KMS nonce value is stored in a secure storage location (e.g., HSM 214) and is uniquely associated with each customer. In other embodiments, the KMS nonce value is received from a customer system (106) or TP (104) and may be set explicitly by the customer. In some embodiments, the nonce generator (206) uses the KMS nonce and a CID value to generate a nonce, as will be described in more detail herein. This generated nonce is referred to as a customer nonce as it is uniquely tied to a customer.

In some embodiments, the nonce generator (206) may be configured to generate the KMS nonce value. In some embodiments, a customer may issue a request for a new nonce from the nonce generator (206). The nonce generator (206) may generate a unique value based on zero or more inputs. In one embodiment, the random value is generated using the CID value, although in other embodiments, other values (or no value) may be used. The nonce generator (206) then stores the KMS nonce and returns the KMS nonce to the customer system (106) or TP (104), thus synchronizing the KMS nonce value. As will be described, the customer nonce is supplied to the activation code generator (210) for the generation of activation codes.

The servers (218) additionally include a device selector (208). In the illustrated embodiment, the device selector (208) is configured to identify a set of UID-MFGSRK pairs based on a request from a customer system (106) or TP (104) received over the NIC (219). In one embodiment, a customer system (106) or TP (104) issues a request for devices by supplying one or more of a date range and a device type. The device selector (208) uses these parameters to extract a set of UID-MFGSRK pairs matching the date range and/or device type.

In one embodiment, a UID includes a date range and a device type within the format of the UID. For example, the UID may include a product code and a date, as well as other data. In this scenario, the device selector (208) may query the HSM (214) by generating a regular expression query or similar query in a language such as structured query language (SQL). For example, the device selector (208) may search for any UIDs match the pattern "PROD20200101*" where "PROD" is a device type, "20200101" is a date (Jan. 1, 2020) within the received data range, and "*" represents zero or more arbitrary characters appearing after the date range. Certainly, other formats and methods of querying may be used, and the disclosure is not limited to a specific UID format.

In other embodiments, the HSM (214) may store dates and device types along with the UID (202) and MFGSRK (204) values. In some embodiments, this data may be stored in a relational database or similar data storage device. In this embodiment, the device selector (208) can issue a query in a language such as SQL based on the received parameters. For example, in place of the previous example, the following pseudo-command may be issued: "SELECT * FROM device WHERE type=PROD and date WITHIN 2020-01-01 and 2020-03-01." In this query, all devices having a type of "PROD" that have a data parameter between Jan. 1, 2020, and Mar. 1, 2020, are selected. As with the previous example, other formats and methods of querying may be used, and the disclosure is not limited to a specific command for querying the HSM (214).

As will be discussed, a customer system (106) or TP (104) generally issues a request for a set of devices when provisioning a device. This request generally is made for a batch of devices in a given date range. After identifying all relevant UID-MFGSRK pairs, the device selector (208) transmits the UID-MFGSRK pairs to the activation code generator (210).

In the illustrated embodiment, the activation code generator (210) generates a unique activation code for each UID in the UID-MFGSRK pairs. As described in more detail, the activation code may be generated based on the MFGSRK and, in some embodiments, the customer nonce as well. The activation code generator (210) re-maps the UID values to the activation codes, generating an activation code database. In the illustrated embodiment, the activation code generator (210) removes the MFGSRKs and does not transmit these keys to the calling party (e.g., customer system or trusted partner). Thus, the activation code generator (210) transmits UID-activation code pairs to the calling party.

In the illustrated embodiment, the activation code generator (210) may also retrieve and send a CAK along with the UID-activation code pairs. In one embodiment, a CAK comprises a symmetric key. In one embodiment, a customer system (106) and manufacturer (110) both maintain the CAK for the given customer. Thus, the manufacturer (110) may store CAKs for each customer, and each customer stores its own CAK. In one embodiment, the CAK is periodically updated (e.g., at regular intervals). The CAK may be written by the manufacturer (110) when manufacturing the device. The manufacturer (110) may periodically transmit CID-CAK pairs to the KMS (102). Since the CAK is periodically updated, the CAK transmitted with the UID-activation code pairs enables a historical record of CAKs in use during the generation of the activation codes. In some embodiments, the CAK and UID-activation code pairs are wrapped in a TLS wrapper and returned to the customer system (106) or TP (104) via a secure channel.

The above operations are described more fully in connection with the descriptions of FIGS. 3 and 4, which are also incorporated in the description of FIG. 2 in their entirety.

FIG. 3 is a flow diagram illustrating a method for building and managing a database of keys according to some embodiments.

In step 302, the method establishes a secure connection with a manufacturer of semiconductor devices. In the illustrated embodiment, the method is performed by a KMS such as KMS (102), and the manufacturer may comprise one or more manufacturers such as manufacturer (110). In the illustrated embodiment, the secure connection comprises a secure network connection. In the illustrated embodiment, the secure network connection comprises a TLS or similar network connection. In some embodiments, the secure connection is also established via a manufacturer (110) logging into the KMS (102). In some embodiments, this logging in may be accomplished via a username and password, a secure token, or other similar security mechanisms. In the illustrated embodiment, after a manufacturer (110) authenticates with the KMS (102), a session is created for subsequent network requests.

In step 304, the method receives UID-MFGSRK pairs from a manufacturer. In the illustrated embodiment, the manufacturer (110) may periodically upload UID-MFGSRK pairs during the process of manufacturing a semiconductor device. As described previously, the UID and MFGSRK are value generated by a manufacturer and, in some embodiments, written to the semiconductor device. Thus, when generating the UID and MFGSRK values, the manufacturer may also upload these identifiers to the KMS. In some embodiments, the manufacturer uploads these values as part of a batch process (e.g., close of business, or some other interval). In the illustrated embodiment, the manufacturer (110) uploads the UID and MFGSRK values in a manner that preserves their relationship. That is, the UID and MFGSRK must be uploaded in a way that KMS can store the relationship between the two values.

In step 306, the method receives current CID and CAK pairs for a given customer. In one embodiment, with each set of UID-MFGSRK pairs, the manufacturer may upload any new CID-CAK pairs. As described above, each customer of the manufacturer is associated with a fixed CID and one or more CAKs. A customer may have multiple CAKs since CAKs may be set to expire at predefined intervals. In one embodiment, the manufacturer identifies all CIDs or CAKs newly generated since the last upload to the KMS. If the instant upload is the first upload, the manufacturer selects all CIDs and CAKs. The method then uploads all new CIDs and CAKs to the KMS as part of step 306, after uploading the UID-MFGSRK pairs.

In one embodiment, step 306 may be performed asynchronously. That is, in some embodiments, step 306 is optional and may be performed independently. In this environment, the method would receive CID and CAK values at the discretion of the manufacturer. For example, the manufacturer may upload new CIDs as they are created and CAKs as they are created. In some embodiments, the KMS includes a separate endpoint for uploading CIDs and CAKs and thus supports parallel uploading of CID and CAK values in addition to UID-MFGSRK pairs.

In some embodiments, the manufacturer associates a CID with one or more UIDs, and thus MFGSRKs. In these embodiments, steps 304 and 306 may be combined. Specifically, when uploading a UID-MFGSRK pair, the manufacturer may also include an associated CID and, in some cases, an associated CAK. In this manner, a self-contained record of customers, keys, and UID-MFGSRK pairs is uploaded. In other embodiments, the method may only upload a CAK if the CAK has changed, thus reducing network utilization.

In step 308, the method stores the UID-MFGSRK pairs and the CID and CAK values in a secure storage location. In one embodiment, the secure storage location comprises an HSM, as described in the description of FIG. 2. As discussed previously, the UID, MFGSRK, CID, and CAK values may be stored in a relational database or similar database. In other embodiments, a log-based storage mechanism may be used to store incoming records.

FIG. 4 is a flow diagram illustrating a method for generating a symmetric key activation database according to some embodiments. In the illustrated embodiment, the method of FIG. 4 is executed at a KMS, such as KMS (102).

In step 402, the method receives a request for activation codes. In one embodiment, the request is transmitted by a trusted partner (104).

In one embodiment, the request is transmitted over a secure channel, such as a TLS channel. In some embodiments, the secure connection is also established via a trusted partner (104) logging into the KMS (102). In some embodiments, this logging in may be accomplished via a username and password, a secure token, or other similar security mechanisms. In the illustrated embodiment, after a trusted partner (104) authenticates with the KMS (102), a session is created for subsequent network requests.

In some embodiments, the request comprises a command and one or more parameters. In one embodiment, the command has a fixed name or opcode to allow the KMS to identify the command. In another embodiment, the command may comprise an endpoint such as an HTTP endpoint and the issuance of, for example, a GET request to the endpoint comprises the command identifier. In some embodiments, the one or more parameters include a CID value, a KMS nonce, a date range, and a device type. Each of these parameters has been previously discussed, and that discussion is not repeated herein but incorporated in its entirety.

In step 404, the method generates a customer nonce. In one embodiment, the method calculates a customer nonce using a SHA-256 function, although other hashing functions may be used. In one embodiment, the method first concatenates the CID and KMS nonce value included in the request. The method then performs a SHA-256 computation on the resulting value. Thus, the customer nonce may be represented as Customer Nonce=SHA-256(CID∥KMS Nonce). Since the values of CID and KMS nonce are known by both the TP (104) and KMS (102), the value of customer nonce may be computed on either system.

In step 406, the method selects all UID-MFGSRK pairs for responsive devices.

In one embodiment, the method extracts the CID from the request and uses the CID to identify all devices for a given customer. The method then queries an HSM using the date range and device type in the request to limit the corpus of devices to the relevant devices.

In one embodiment, a UID includes a date range and a device type within the format of the UID. For example, the UID may include a product code and a date, as well as other data. In this scenario, the method may query the HSM by generating a regular expression query or similar query in a language such as structured query language (SQL). For example, the method may search for any UIDs match the pattern "PROD20200101*" where "PROD" is a device type, "20200101" is a date (Jan. 1, 2020) within the received data range, and "*" represents zero or more arbitrary characters appearing after the date range. Certainly, other formats and methods of querying may be used, and the disclosure is not limited to a specific UID format.

In some embodiments, where a relational database or similar storage device is used, the method constructs a query to access the relevant UID-MFGSRK pairs. For example, a query having the form of "SELECT * FROM table WHERE CID=1234 AND type=PROD AND date IN 2020-01-01 to 2020-03-01." In this pseudo-query, the method identifies all devices for a customer with CID 1234 having a device type of PROD and manufactured between Jan. 1, 2020, and Mar. 1, 2020.

In step 408, the method selects a UID-MFGSRK pair and, in step 410, generates an activation code for the selected UID-MFGSRK pair. In step 412, the method determines if all UID-MFGSRK pairs have been selected. If not, the method continues to select each pair (step 408) and generate an activation code for each pair (step 410) until detecting all pairs have been selected in step 412.

In steps 408-412, the method generates activation codes for each UID-MFGSRK pair. In one embodiment, an activation code for a given UID-MFGSRK pair is generated using an HMAC function. In one embodiment, the customer nonce generated in step 404 is used as the message for an HMAC function. In one embodiment, the HMAC using the value of MFGSRK as a key. Thus, the activation code may be computed as Activation Code=HMAC(MFGSRK, Customer Nonce).

In step 414, the method pairs each of the activation codes with a corresponding UID. In one embodiment, step 414 may be performed as part of step 410. Thus, at the conclusion of step 414, the method obtains a listing of UID-Activation Code pairs that correspond to the original UIDs in the UID-MFGSRK pairs.

In step 416, the method transmits the UID-Activation Code pairs to the trusted partner. In one embodiment, the method additionally transmits a CID value and one or more CAK values associated with the date range used to select the UID-MFGSRK pairs, as previously discussed.

In the illustrated embodiment, the activation codes are controlled by the KMS since the values of MFGSRK are not public or exposed to TP (104) or customer systems (106). Thus, the KMS (102) can act as the canonical source for activation codes. However, in some embodiments, semiconductor devices (108) include the MFGSRK as well. In these embodiments, described more fully in co-pending and commonly owned patent application bearing Ser. No. 17/014,203, a customer can supply the semiconductor device with the CID and KMS nonce values, enabling the semiconductor devices (108) to independently generate the same activation code generated by the KMS (102). Thus, in some scenarios, the KMS (102), TP (104), and semiconductor devices (108) will all have access to a generated and secret activation code. As described in more detail in co-pending and commonly owned patent application bearing Ser. No. 17/014,206, these activation codes are used by the TP (104) and semiconductor devices (108) to generate new storage root keys in response to a request from a customer and without the customer obtaining access the secret information (such as MFGSRK values or the values of the new keys).

Figure 5:
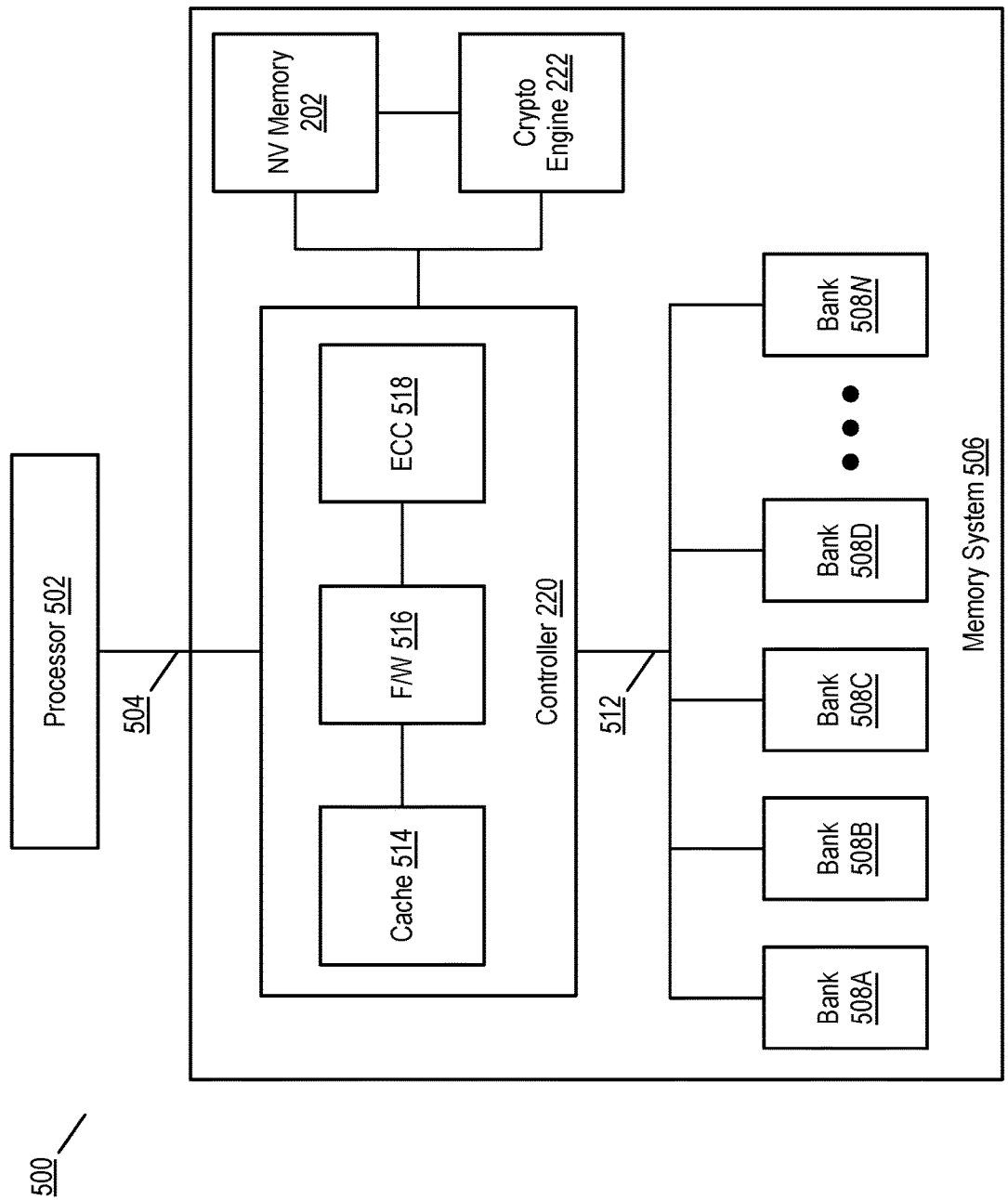
FIG. 5 is a block diagram illustrating a memory system according to some embodiments of the disclosure.

FIG. 5 is a block diagram illustrating a memory system according to some embodiments of the disclosure.

As illustrated in FIG. 5, a computing system (500) includes a processor (502) communicatively coupled to a memory system (506) via a bus (504). The memory system (506) comprises a controller (220) communicatively coupled to one or more memory banks (508A-N) via a bus/interface (512). As illustrated, the controller (220) includes a local cache (514), firmware (516), and ECC module (520).

In the illustrated embodiment, processor (502) can comprise any type of computing processor such as a central processing unit, graphics processing unit, or other type of general or special-purpose computing device. Processor (502) includes one or more output ports that allow for the transmission of address, user, and control data between processor (502) and the memory system (506). In the illustrated embodiment, this communication is performed over bus (504). In one embodiment, the bus (504) comprises an input/output (I/O) bus or similar type of bus.

The memory system (506) is responsible for managing one or more memory banks (508A-508N). In one embodiment, the banks (508A-508N) comprise NAND Flash dies or other configurations of non-volatile memory.

The banks (508A-508N) are managed by the controller (220). In some embodiments, the controller (220) comprises a computing device configured to mediate access to and from banks (508A-508N). In one embodiment, the controller (220) comprises an ASIC or other circuitry installed on a printed circuit board housing the banks (508A-508N). In some embodiments, the controller (220) may be physically separate from the banks (508A-508N). Controller (220) communicates with the banks (508A-508N) over interface (512). In some embodiments, this interface (512) comprises a physically wired (e.g., traced) interface. In other embodiments, the interface (512) comprises a standard bus for communicating with banks (508A-508N).

Controller (220) comprises various modules (514-518). In one embodiment, the various modules (514-518) comprise various physically distinct modules or circuits. In other embodiments, the modules (514-518) may completely (or partially) be implemented in software or firmware.

As illustrated, firmware (516) comprises the core of the controller and manages all non-cryptographic operations of the controller (220). Cryptographic engine (222) is provided for cryptographic operations, as described in more detail in commonly owned and co-pending application bearing Ser. No. 17/014,203, the disclosure of which is incorporated herein by reference in its entirety. In brief, the cryptographic engine (222) is configured to perform MAC calculations. These MAC calculations are used to generate new secret keys to replace and existing manufacturers secret key. Further detail is provided in commonly owned and co-pending application bearing Ser. No. 17/014,203.

Thus, firmware (516) mediates access to banks (508A-508N) for non-cryptographic operations. As illustrated, both controller (220) and engine (222) access non-volatile (NV) storage (202). Details of accessing NV storage (202) are provided in the description of commonly owned and co-pending application bearing Ser. No. 17/014,203 and are not repeated herein.

Figure 6:
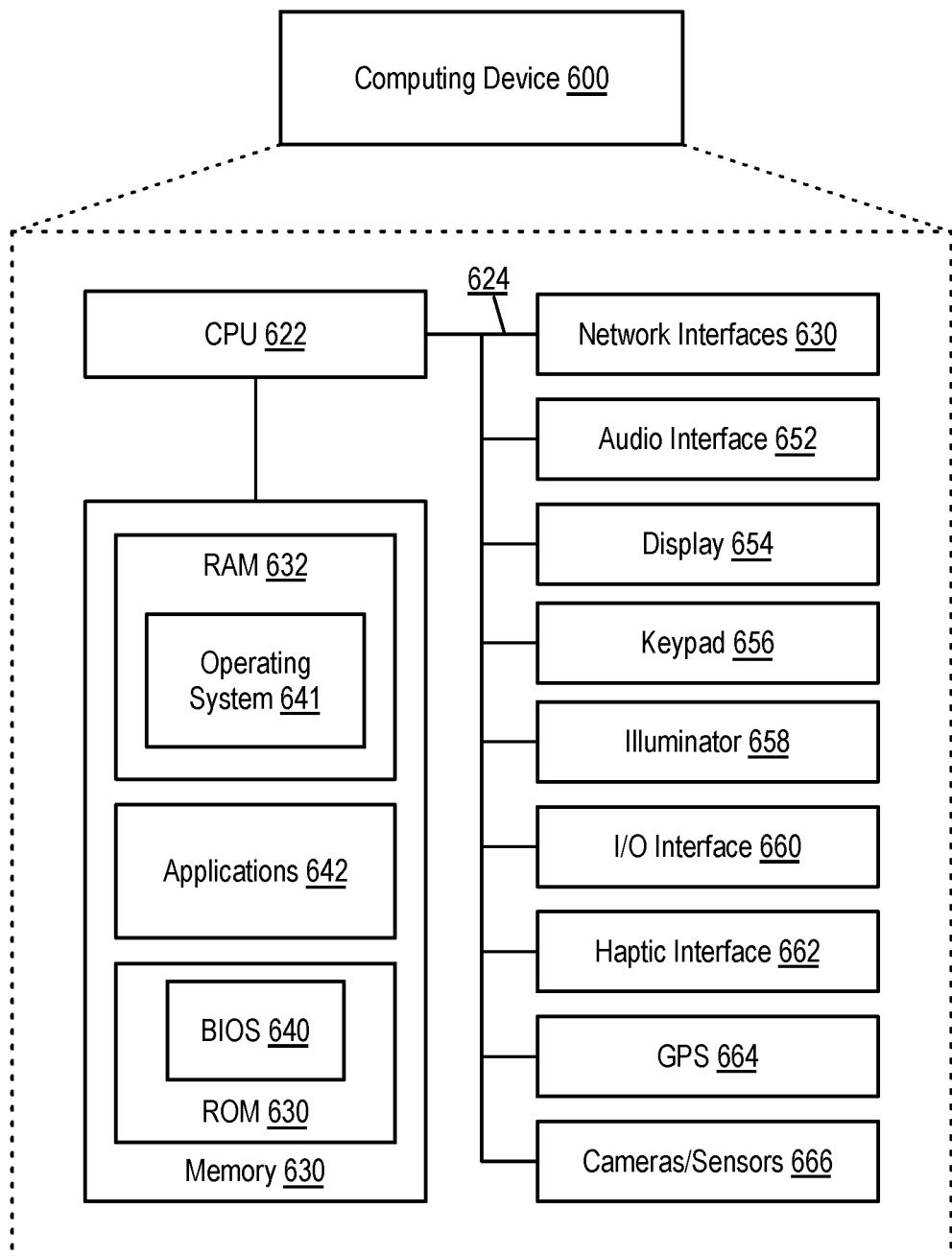
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure. The device (600) may comprise a computing device used by manufacturer (110), KMS (102), TP (104), or customer system (106). Further, various components (e.g., 730, 734) may comprise a device including a semiconductor device (108) or may comprise the semiconductor device (108) itself.

The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown), or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth™, or the like. The haptic interface (662) provides tactile feedback to a user of the client device.

Optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600).

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving a request for an activation code database from a remote computing device, the request including at least one parameter comprising at least a device type, a date range, a customer identifier, and a nonce value;
retrieving a plurality of pairs based on the at least one parameter, each of the plurality of pairs including a unique identifier and secret key, wherein the plurality of pairs corresponds to semiconductor devices associated with the customer identifier, wherein the semiconductor devices of the device type indicated in the request, and wherein the semiconductor devices are manufactured within the date range indicated in the request;
generating at least a first activation code for a first unique identifier of the plurality of pairs using, at least in part, the nonce value and the customer identifier; and
returning the first activation code to the remote computing device.

2. The method of claim 1, wherein the request is received using a secure communications channel.

3. The method of claim 1, wherein retrieving the plurality of pairs comprises querying a hardware security manager using the customer identifier, device type, and date range.

4. The method of claim 1, wherein the nonce value is a first nonce value, and further wherein generating at least the first activation code comprises:
generating a second nonce value using the first nonce value and the customer identifier;
generating the first activation code using the second nonce value and the secret key.

5. The method of claim 4, wherein generating the second nonce value comprises computing a hash of results of concatenating the first nonce value and the customer identifier.

6. The method of claim 4, wherein generating the first activation code comprises generating a message authentication code for the secret key.

7. The method of claim 6, wherein the message authentication code comprises a hash-based message authentication code and the generating the first activation code comprises using the second nonce as the message and the secret key as the message for the hash-based message authentication code.

8. The method of claim 1, wherein returning the first activation code to the remote computing device further comprises returning a customer identifier value and at least one customer authentication key with the activation code.

9. A non-transitory computer-readable storage medium for tangibly storing computer program instructions capable of being executed by a computer processor, the computer program instructions defining steps of:
receiving a request for an activation code database from a remote computing device, the request including at least one parameter comprising at least a device type, a date range, a customer identifier, and a nonce value;
retrieving a plurality of pairs based on the at least one parameter, each of the plurality of pairs including a unique identifier and secret key, wherein the plurality of pairs corresponds to semiconductor devices associated with the customer identifier, wherein the semiconductor devices of the device type indicated in the request, and wherein the semiconductor devices are manufactured within the date range indicated in the request;
generating at least a first activation code for a first unique identifier of the plurality of pairs using, at least in part, the nonce value and the customer identifier; and
returning the first activation code to the remote computing device.

10. The non-transitory computer-readable storage medium of claim 9, wherein the nonce value is a first nonce value, and wherein generating at least the first activation code comprises:
generating a second nonce value using the first nonce value and the customer identifier;
generating the first activation code using the second nonce value and the secret key.

11. The non-transitory computer-readable storage medium of claim 10, wherein generating the second nonce value comprises computing a hash of results of concatenating the first nonce value and the customer identifier.

12. The non-transitory computer-readable storage medium of claim 10, wherein generating the first activation code comprises generating a message authentication code for the secret key.

13. The non-transitory computer-readable storage medium of claim 9, wherein returning the first activation code to the remote computing device further comprises returning a customer identifier value and at least one customer authentication key (CAK) with the activation code.

14. A device comprising:
a processor; and
a storage medium for tangibly storing thereon program logic for execution by the processor, the stored program logic configured to cause the processor to:
receive a request for an activation code database from a remote computing device, the request including at least one parameter comprising at least a device type, a date range, a customer identifier, and a nonce value;
retrieve a plurality of pairs based on the at least one parameter, each of the plurality of pairs including a unique identifier and secret key, wherein the plurality of pairs corresponds to semiconductor devices associated with the customer identifier, wherein the semiconductor devices of the device type indicated in the request, and wherein the semiconductor devices are manufactured within the date range indicated in the request;
generate at least a first activation code for a first unique identifier of the plurality of pairs using, at least in part, the nonce value and the customer identifier; and
return the first activation code to the remote computing device.

15. The device of claim 14, wherein the nonce value is a first nonce value, and wherein the generation of the first activation code comprises the stored program logic further causing the processor to:
generate a second nonce value using the first nonce value and the customer identifier;
generate the first activation code using the second nonce value and the secret key.

16. The device of claim 15, wherein the generation of the second nonce value comprises the stored program logic further causing the processor to compute a hash of results of concatenating the first nonce value and the customer identifier.

17. The device of claim 15, wherein the generation of the first activation code comprises the stored program logic further causing the processor to generate a message authentication code for the secret key.

18. The device of claim 14, wherein the return of the activation code to the remote computing device further comprises the stored program logic further causing the processor to return a customer identifier value and at least one customer authentication key with the first activation code.

* * * * *